June 7, 1966
G. L. GRIFFITH ETAL  3,254,601
SEISMIC EXPLORATION DEVICE AND EXTRUDABLE EXPLOSIVE COMPOSITION OF SEMI-SOLID CONSISTENCY
Filed Jan. 16, 1962  3 Sheets-Sheet 1
FIG. 1
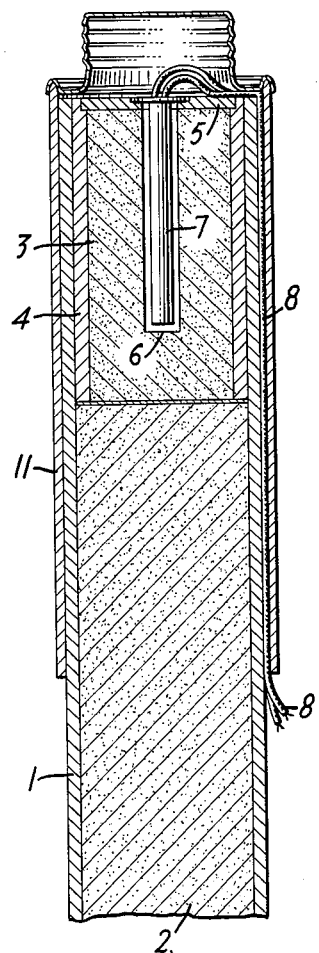
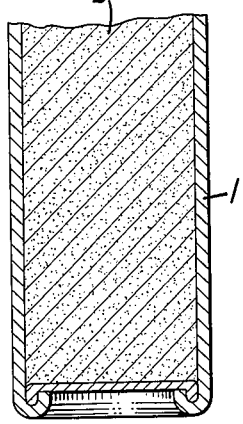
FIG. 2
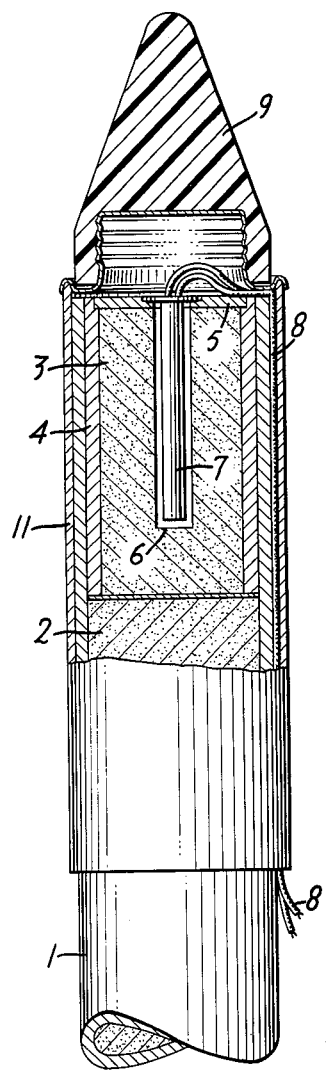
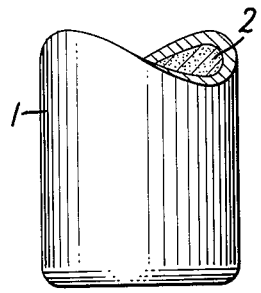

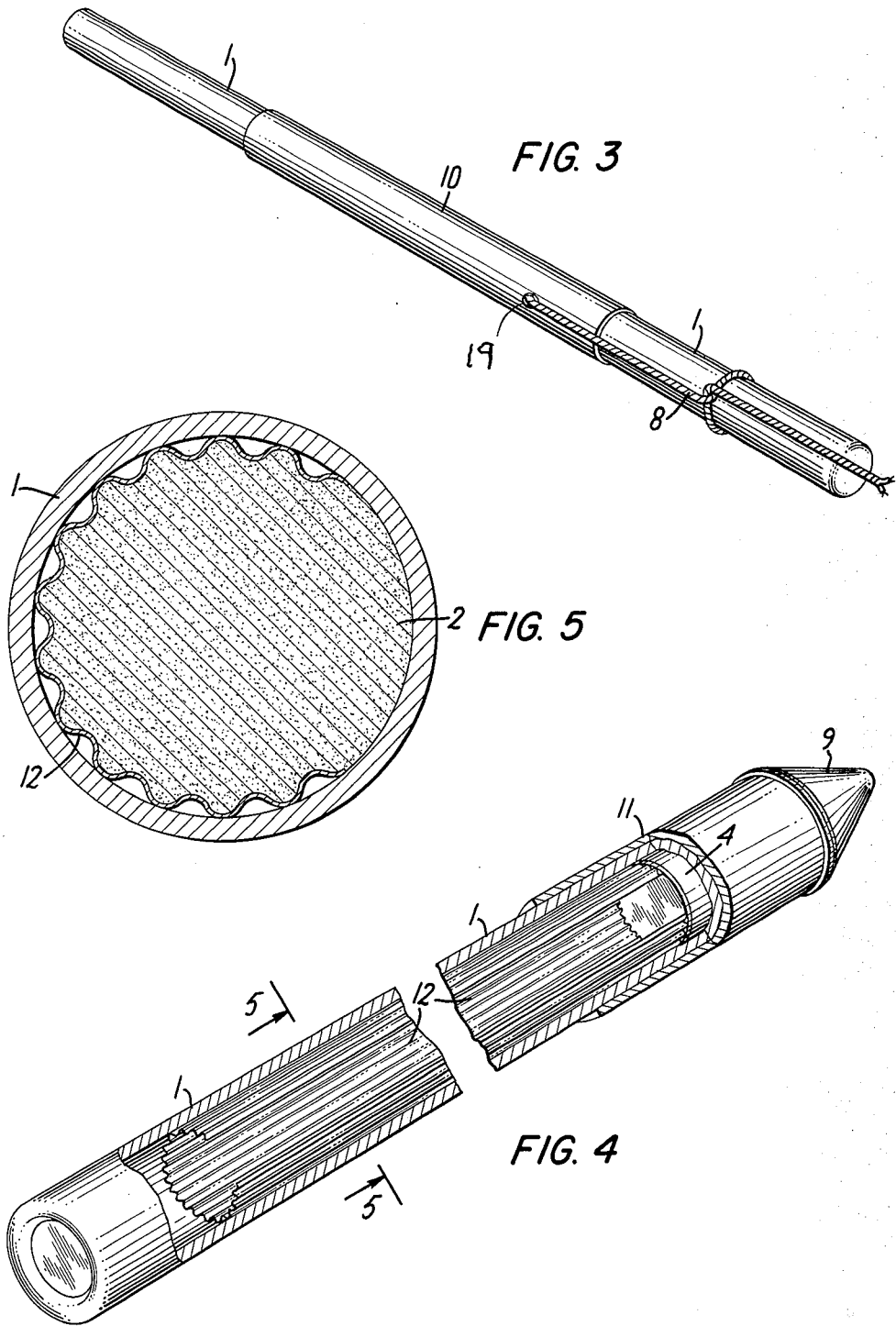

June 7, 1966    G. L. GRIFFITH ETAL    3,254,601
SEISMIC EXPLORATION DEVICE AND EXTRUDABLE EXPLOSIVE
COMPOSITION OF SEMI-SOLID CONSISTENCY
Filed Jan. 16, 1962    3 Sheets-Sheet 3
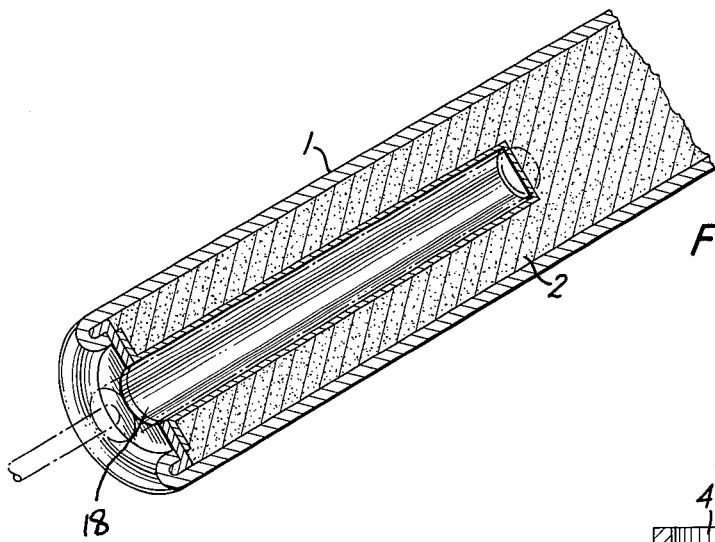
FIG. 6
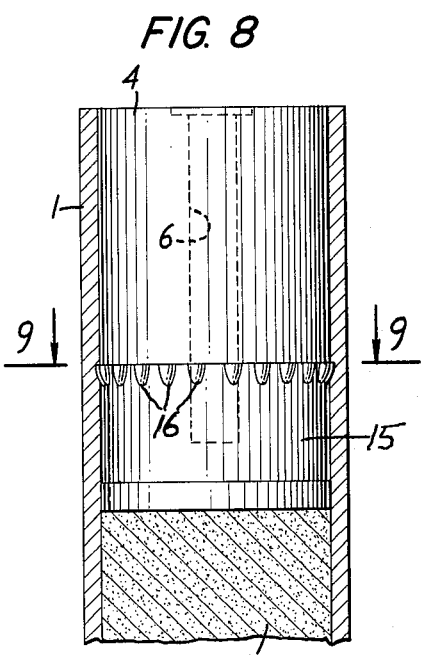
FIG. 8
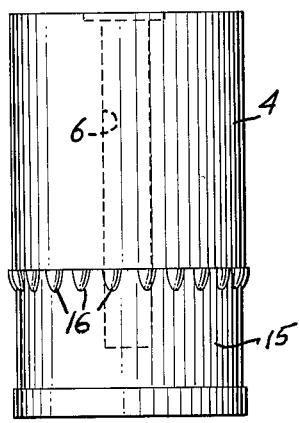
FIG. 7
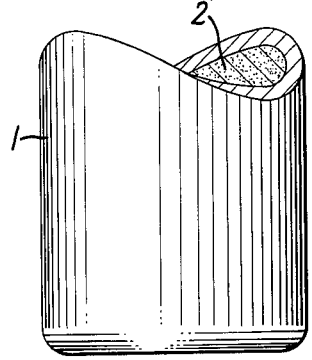
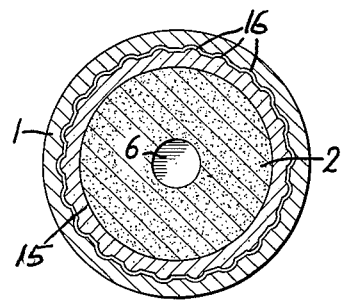
FIG. 9

United States Patent Office 3,254,601
Patented June 7, 1966

3,254,601
SEISMIC EXPLORATION DEVICE AND EXTRUD-
ABLE EXPLOSIVE COMPOSITION OF SEMI-
SOLID CONSISTENCY
George L. Griffith and George F. Knotts, Coopersburg,
and William L. Schwoyer, Allentown, Pa., assignors to
Trojan Powder Company, Allentown, Pa., a corpora-
tion of New York
Filed Jan. 16, 1962, Ser. No. 166,508
5 Claims. (Cl. 102—24)

This invention relates to a new form of seismic explora-
tion device and to an extrudable explosive composition of
semi-solid consistency especially formulated for use in
such devices, and more particularly to insensitive high-
velocity seismic exploration devices and extrudable semi-
solid seismic explosive compositions therefor.

Explosives are now widely used both on dry land and
underwater in the seismic exploration of land strata, in
order to detect valuable mineral and oil deposits whose
presence is not, of course, readily determined from surface
observation. A controlled explosive is set off to create
a shock wave which is reflected off or refracted along the
layer or deposit below, and the travel of the shock wave
is recorded in the form of pulses (interruptions or energy
bursts) on a timed line. From the recording, it is possible
to determine both the depth of the layer and the type of
layer. In this work, it is quite important that the pulse
recorded on the timed line be as sharp as possible, for
accurate determination of the information on the layer.

No one heretofore has ever formulated an explosive
and an explosive container specifically tailored to the
safety and shooting requirements of geophysical crews.
The explosive of choice in seismic exploration units has
been nitroglycerine, but this has been used merely because
it was the best available for the purpose. The explosive
has a function quite different from that of ordinary ex-
plosives. The objective is not to move quantities of rock
or earth, but to produce a shock wave capable of travel-
ing great distances through the earth or water. Nitro-
glycerine has the advantages of low cost and high power,
although is does present hazards in manufacture, han-
dling and use because of its high sensitivity to shock,
and its semi-toxic effects upon those who come in close
contact with it. Nitroglycerine, for example, is quite
capable of exploding merely during the seaming of con-
tainers, or in the loading or jolting of containers in
transport. These disadvantages have not offset its very
desirable characteristics of exploding well in trains of
more than one explosive cartridge, as frequency may be
required to produce a shock capable of traveling great
distances through the earth or through water.

In accordance with the invention, a seismic explosive
composition is provided which is especially formulated
so as to be capable of detonation at a fast rate, and to
give a sharp pulse recording. This explosive, further-
more, is so formulated as to be of semi-solid consistency,
and to be capable of being loaded by extruders into the
explosives container. The new explosive composition
is provided in combination with a new design of explosive
cartridge having unique characteristics, particularly adapt-
ing it for use in seismic exploration, by incorporating
a booster and space for a blasting cap appropriately
selected to fire the device under the conditions of use.

*The seismic explosive composition*

The extrudable seismic explosive composition employed
in the devices of the invention is based on a combina-
tion of inorganic nitrates as the oxidizer, ammonium
nitrate being the principal inorganic nitrate, and the ni-
trates of alkali and alkaline earth metals, such as sodium
nitrate, potassium nitrate, and barium nitrate, exemplary
supplementary inorganic nitrates. Sodium nitrate is pre-
ferred as the nitrate for use with ammonium nitrate.
In addition to the nitrates, there is used a sensitizer, pref-
erably nitrostarch, one or more fuels, including metal
fuels and carbonaceous fuels, and a sufficient amount of
water to reduce the sensitivity of the mixture so that it
is insensitive in the rifle ball test.

The extrudability is imparted by a small amount of
particulate aluminum, which greatly aids lubricity. An
amount as little as 0.5% aluminum by weight of the
explosives composition markedly improves lubricity and
such compositions are extrudable through long, small di-
ameter nozzles, of the order of one to one and one quarter
inches in diameter. At least 1% is preferred in most
cases. There is no critical upper limit from the stand-
point of extrudability. However, the aluminum also serves
as a fuel, and the maximum amount will be determined
by the oxygen balance of the composition, and would not
usually exceed about 5%. Flake aluminum is a preferred
particulate form, but powdered aluminum can also be
used. Additional but less desirable lubricants that can
be used to supplement but not to replace the aluminum
include finely divided graphite, mica, talc, aluminum
stearate and zinc stearate.

In this composition, the relative proportions of am-
monium nitrate and other inorganic nitrate or nitrates
are important to the seismic explosive shock wave. The
ammonium nitrate would be in a proportion within the
range from about 50 to about 95%, and the other nitrate
or nitrates in a proportion within the range from about
5 to 50% of the total nitrates. For optimum power,
the proportions are from 80 to 90% ammonium nitrate,
and from 10 to 20% other nitrate or nitrates. A nitrate
mixture of approximately 80 to 90% ammonium nitrate
and 10 to 20% of the other nitrate or nitrates is in most
cases the best. The particular proportions of oxidizers
selected within these ranges will depend upon the sen-
sitivity and explosive effect desired, and these in turn
are dependent upon the particular nitrate or nitrates used.

The inorganic nitrates can be fine, coarse, or a blend
of fine and coarse materials. Mill and prilled inorganic
nitrates are quite satisfactory. For best results, the so-
dium nitrate and ammonium nitrate should be fine-
grained.

The preferred sensitizer is nitrostarch, but this can
be used not only alone but in a mixture with any of
those chemicals known as sensitizers in this art, includ-
ing, for example, trinitrotoluene, dinitrotoluene, penta-
erythritol tetranitrate, nitrostarch, Pentolite (an equal
parts by weight mixture of pentaerythritol tetranitrate and
trinitrotoluene), Cyclonite (RDX, cyclotrimethylene tri-
nitramine), nitrocellulose, Composition B (a mixture of
up to 60% RDX, up to 40% TNT, and 1 to 4% wax),
Cyclotol (Composition B without the wax), tetryl, and
smokeless powder such as carbine ball powder. Nitro-
starch is preferred because it gives the greatest explosive effect in combination with the mixture of ammonium nitrate and other nitrate.

The relative proportions of nitrate oxidizer and sensitizer will depend upon the sensitivity and explosive shock wave desired, and these, again, are dependent upon the particular nitrate and sensitizer. The proportions are not critical in any way. For optimum effect, the nitrate oxidizer is used in an amount within the range from about 10 to about 75%, and the sensitizer in an amount within the range from about 12 to about 40% by weight of the explosive composition. From about 25 to about 30% sensitizer give the best results.

When the amount of sensitizer is in the lower par of the range, a larger booster is needed. At amounts beyond 40%, the sensitizing effect falls off, and is no longer proportional to the amount of sensitizer added, and therefore amounts beyond 40% are not usually used.

Sensitizers of any particle size can be used. They can, for example, be fine, coarse, or a blend of fine and coarse material. Some materials, such as nitrostarch, are commercially available as very finely-divided powders, and so also is trinitrotoluene. Such available materials are employed to advantage, because in most cases they tend to produce compositions having a greater explosive effect.

In addition to these materials, as has been indicated, the explosive compositions of the invention include a particulate metal fuel, for example, the aluminum powder or flake aluminum serving as a lubricity improving agent. A metal fuel will usually comprise from about 0.5% to about 5% of the composition. In addition to the metal fuel, a carbonaceous fuel can be included, as an optional ingredient, such as powdered coal, petroleum oil, coke dust, charcoal, bagasses, dextrine, starch, wood meal, flour, bran, pecan meal, and similar nut shell meals. A carbonaceous fuel when present will usually comprise from about 0.5 to about 7% of the mixture. Mixtures of metal and carbonaceous fuels can be used, if desired.

An antacid, or other stabilizing material, such as zinc oxide, calcium carbonate, aluminum oxide, and sodium carbonate, can also be added. Such ingredients will comprise about 0.3 to about 2% of the mixture.

The amount of water that is employed is rather small, less than will produce a slurry of the explosive mixture, but enough to impart to the composition a semi-solid consistency, and to render the composition insensitive to shock. Surprisingly, although water desensitizes the mixture, it does not reduce the explosive power, but increases it. As little as 0.5% water may suffice, and usually not more than 10% need be used. This may, however, exceed the amount of water which is capable of being absorbed by the components of the mixture. In order to prevent large amounts of water, if required, from decreasing the consistency unduly, to a slurry, water-soluble or water dispersible thickeners can be added to take up the water, for example, such as carboxymethyl-cellulose, methyl cellulose, guar gum, psyllium seed mucilage, and pregelatinized starches, such as Hydroseal 3B. The amount of such thickening agent will depend upon the semi-solid consistency desired, and the amount of unabsorbed or free water, and usually will be within the range from about 1 to about 5%.

The explosive of the invention, being relatively insensitive, is fired with the aid of a booster charge. Any conventional cap-sensitive booster charge available in the art can be employed. Pentaerythritol tetranitrate, Composition B and Pentolite are exemplary. The booster charge preferably is non-shock or impact-sensitive. The amount of booster charge required depends, of course, upon the amount and sensitivity of the explosive mixture.

The explosive mixture is readily prepared by simple mixing of the ingredients. The solid materials, including the inorganic nitrate and sensitizer, fuels, and antacid, if any, would usually be mixed first, to form a homogeneous blend, and the oil, water, and water thickener, if required, would be added, with stirring to bring the mixture to the desired semi-solid consistency, usually comparable to that of a gelled oil or thick, barely pourable mixture.

The seismic exploration device

This explosive composition is then extruded into open ended cartridges, using conventional extrusion equipment to produce the seismic exploration device of the invention, of which a typical embodiment is shown in longitudinal section in FIGURE 1.

FIGURE 2 is a view in longitudinal section of the cartridge of FIGURE 1, having a nose cone affixed.

FIGURE 3 is a perspective view of the cartridge of FIGURE 1, connected by a coupler in a train.

FIGURE 4 is a perspective view of a cartridge including means for taking up expansion of the explosive.

FIGURE 5 is a cross-sectional view along the line 5—5 of the cartridge of FIGURE 4.

FIGURE 6 is a perspective view of a cartridge including an alternative means for taking up expansion of the explosive.

FIGURE 7 shows a booster charge container similar to that of FIGURE 4, equipped with a serrated gripping ring.

FIGURE 8 shows the container of FIGURE 7 fitted in an explosive cartridge.

FIGURE 9 is a cross-sectional view along the line 9—9 of FIGURE 8.

Like numerals in these figures refer to like parts.

The explosive device of FIGURE 1 comprises a cartridge 1 which is practically filled with seismic explosive composition 2 as previously described, and a booster composition 3, held in container 4. The cartridge is of a convenient length and diameter, proportionate to the amount of explosive 2 needed for the explosive effect desired, and to the size of booster 3 required to set off the explosive. A cartridge two inches in diameter will preferably be from approximately 2 to about 2½ feet long and would be filled with seismic explosives to a depth of approximately 2½ to 27½ inches. This diameter is not critical, however, and two foot cartridges can have diameters within the range from about ½ to about 6 inches, without need to shorten or lengthen the cartridge in proportion.

The cartridge will normally have a somewhat heavier wall than is normally used, at least ⅛ inch and up to about 3 inches in diameter, depending upon the material used.

The remainder of the cartridge is filled with the booster charge 3, held in container 4. In a two foot, two-inch diameter cartridge, a booster charge 2½ inches in length is a sufficient amount, but this can, of course, be varied, and necessarily will be increased or decreased as the diameter of the cartridge is increased or decreased, and greater or lesser amounts of explosive composition are present.

The explosive mixture, since it is of semi-solid consistency, is not always adequate support for the booster charge container. The booster charge container may be held to the inside wall of the shell by an adhesive, or by an alternative method such as a serrated metal ring or cylinder provided with gripping teeth. This metal ring or cylinder may be the same type as is used in the fast coupler noted below, and is fully described in U.S. Patent 2,415,422. It is preferred to use this type of ring modified to grip externally, and affixed to the booster container itself. Such a means of holding the booster in position is illustrated in FIGURES 7, 8 and 9, the cylinder encasing the lower part of the booster container and being designated 15 and the teeth 16.

In the cartridge shown in FIGURE 1, the open end of the booster charge container 4 is closed off by the top or cover disk 5, which is provided with a central opening, giving access to a blasting cap well 6 in the body of booster charge 3.

The bottom of the booster charge container can, if desired, be a disk of aluminum foil or other thin metal, so as to assist in transmission of the shock to the explosive mixture.

Disposed in this well is an electric blasting cap 7, fitted with a pair of wires 8, for connection to a battery or other source of electric current. This blasting cap would normally be inserted by the user just before placing the cartridge in the bore hole.

In order to prevent dislodging of the blasting cap during insertion in the hole, the invention provides two alternative devices: (1) a nose cone and nose cone sleeve, best seen in FIGURE 2, wherein the cone is indicated by 9, and the sleeve by 11, normally employed when only one cartridge is inserted, head down, in the bore hole, or (2) a fast coupler, best seen in FIGURE 3, wherein it is indicated by 10, which attaches the open end of one cartridge to the butt end of the next cartridge in a train. Either of these alternatives provides sufficient protection for the blasting cap and the wires to facilitate insertion in the bore hole.

Insertion of seismic explosive cartridges in bore holes has presented a problem heretofore, because of the danger of the wires of the blasting cap catching on the sides of the hole, thus pulling the cap out of the cartridge as the latter is forced further down the hole. This possibility is prevented, in accordance with the invention, by pinning the wires of the blasting cap tightly against the outside wall of the cartridge by means of the nose cone or coupler. As best seen in FIGURES 2 and 3, the nose cone is threadably attached to the end of a sleeve 11, and both the nose cone sleeve and coupler fit over the open end of the cartridge in such a manner as to pin the wires of the blasting cap between the inside wall of the cone or coupler, and the outside wall of the cartridge, so that the wires are held tightly in the space between them and effectively prevented from contact with the sides of the bore hole. The wires nonetheless can be brought away from the device for connection to a source of electricity. The cartridge end is also completely protected from shock or external force during such insertion, by the nose cone or coupler.

In most instances, the nose cone is employed only when a single cartridge is used, since this would be inserted with the blasting cap end down in the bore hole. If more than one cartridge is used, in the form of a train, the stick, or train, is primed only at the bottom of the top stick, the detonation of this stick setting off the remainder in the train, and in this event, no nose cone is required, since no blasting cap is inserted in the end stick. Sufficient protection is thus furnished by the coupler.

It is possible, by means of the coupler, to connect the cartridges of the invention in trains of two or more; there is no upper limit on the number of cartridges in a train, inasmuch as this will depend upon the explosive shock required, the depth and diameter of the bore hole and of the cartridges, and the types of booster and explosive mixture employed.

In using the cartridge of FIGURE 1, the operator simply inserts a blasting cap in the open well of the booster charge 3, and, if the cartridge is to be used alone, then places a nose cone over the blasting cap end, to produce the covered structure shown in FIGURE 2. This is then placed in the bore hole, nose cap down. The wires of the blasting cap are, of course, sufficiently long to permit connection of the cartridge to the battery or other means for setting off the cap, at the safe distance from the bore hole.

If a train of explosives is required, the cartridge of FIGURE 1 is employed as the uppermost cartridge in the train, as placed in the bore hole. The butt end of the second cartridge in the train is first inserted in the coupler, and then the first cartridge bearing the blasting cap is inserted in the other end of the coupler. The remaining cartridges of the train are then fitted together, top to butt, by means of the coupler, but no blasting caps are required. The booster charge in each cartridge boosts the shock wave sufficiently so that it is propagated down the train to the very end.

In the event that the cartridges of this invention filled with an explosives composition of semi-solid consistency are to be stored for any length of time, or are to be stored or used where the temperature may exceed about 90° F. it is desirable to provide for expansion of the ingredients. Such expansion appears due to two main causes, either or both of which may have undesirable results, such as pushing the booster partially out of the cartridge or causing the bottom of the cartridge to open. The first and major cause of the expansion appears to be due to the fact that when the temperature of ammonium nitrate is raised above 89.8° F. it undergoes a phase change, accompanied by an expansion of about 4.4%. The second cause of expansion is due to the expansion of air occluded in the mixture, due to increasing temperatures. Expansion difficulties become apparent with compositions of semi-solid consistency such as are described herein since they are capable of flow, whereas normal dry compositions are not.

There are many ways to provide for release of the pressure of this expansion without distortion of the cartridge itself. A preferred method is the insertion within the cartridge of a strip of a standard corrugated material, as is illustrated in FIGURE 4. The corrugated material 12 is placed just inside the wall of the cartridge 1. For a 2 inch diameter shell 30 inches long, a piece of corrugated material 3 inches wide by 27 inches long would be inserted, while for a 3 inch diameter by 24 inch length shell, the strip would be 4 inches by 21 inches. The actual shape of this corrugated material is immaterial, as long as it has an area of about 80 sq. in. for about 90 cu. in. of volume. The size of this piece of material must, of course, be altered to accommodate the needs of cartridges of different dimensions. It is understood that when such corrugated material is used, the exterior diameter of the extrusion nozzle must be reduced accordingly.

Alternatively, a means of taking up expansion without distortion of the cartridge is provided by a paper-lined expansion shell obtained by insertion of a cylinder closed at one end. In a 2 inch x 30 inch cartridge, a cylinder is a satisfactory size. This cylinder may be prepared in any desired manner and need not necessarily be of paper, but the preferred procedure is to use a standard 1 inch x 6 inch spiral wound shell crimped at one end. This small shell is inserted into the explosive in the end of the extrusion tube and then when the cartridge is filled, the small shell is at the bottom thereof with its open end against the crimped end of the explosive cartridge which is opposite the booster. The size of this small inserted shell varies with volume of explosive, as does that of corrugated material. Such a small empty shell is illustrated in FIGURE 6, which shows a waxed 1 inch x 8 inch paper shell 18, placed on a mandrel before loading and then carried by the explosive 2 during loading to the position shown at the bottom of the cartridge 1, with its open end against the bottom end of the cartridge.

Any blasting cap can be used, the size depending upon the booster charge and explosive mixture. If Pentolite is the booster, a Number 6 electric blasting cap is preferred, whereas if Composition B is the booster, blasting cap Number 16 is preferred.

It will be noted that the coupler employed in accordance with the invention, as best seen in FIGURE 3 is provided with a hole 19 in one side. This hole is required for exit of the blasting cap wires 8 from the interior of the coupler 10. The wires normally are threaded through the hole before the cartridge is inserted in the coupler. The wires are held in place between the inside wall of the coupler and the outside wall of the cartridge, after insertion of the cartridge in the coupler, thus making it impossible to dislodge the blasting cap from the well once it has been inserted against the butt end of the next cartridge in the train. The wires are connected to the outside source of electric current.

The preferred form of coupler employed in accordance with the invention is a fast coupler, described more fully in U.S. Patent No. 2,415,422, but modified to include a hole for the blasting cap wires, as shown in FIGURE 3. This coupler is provided with fixed teeth at one end, and movable teeth on the other. Such couplers are employed by first inserting the crimped end of the cartridge into the end of the coupler having movable teeth. This is performed, normally, at the explosive manufacturing plant prior to shipment. In the field, additional cartridges are joined together by inserting the booster end of the cartridge to be added into the open end (having fixed teeth) of the coupler which is attached to the adjacent charge. This makes it possible to insert the second cartridge in the coupler so that it comes into intimate contact with the cartridge already held by the coupler and eliminates the possibility of any gaps between cartridges being joined.

The cartridge and booster containers can be formed of any container material. Heavy cardboard is inexpensive, and available in sufficient thickness of wall, and is therefore preferred. The cartridge and container can also be formed of plastic and cellulosic materials such as polyethylene, ethyl cellulose, cellulose acetate, polypropylene, polytetrafluoroethylene, nylon, polyvinyl chloride, polystyrene and polyvinylidene chloride, and non-ferrous metals, such as tin, copper and aluminum. Fibrous materials such as wood, paper, and cardboard can be used as such, or, if desired, can be impregnated with a synthetic resin to improve strength and water-resistance. After fitting of the nose cone or fast coupler, the cartridges of the invention are fully protected against water, and can be used under water, if desired, or in wet bore holes. They thus are adapted for use in seismic exploration both on land and under water.

The seismic exploration devices of the invention, when loaded with a seismic explosive mixture in accordance with the invention, are sufficiently insensitive to shock to withstand the standard rifle ball test. This test involves firing into the cartridges, using a 30–06 rifle at a distance of from 50 to 100 feet. This is in contrast to available seismic explosive units, including highly sensitive gelatin dynamite, which are readily exploded by this test, and indeed in many cases explode upon impact or shock. Because of their high insensitivity, the explosive devices of the invention will not propagate from bore hole to bore hole, and are insensitive both to shock and to friction.

The seismic exploration devices of the invention, in addition, have a high rate of detonation, as high, unconfined, as 5500 meters per second. This high rate of detonation is characteristic of sticks ranging in diameter from ½ to 8 inches, a rather surprising property. As a self-contained unit, with its own built-in booster, it is readily fired on simple insertion of a blasting cap, in contrast to conventional seismic explosives which are composed of nitrocarbonitrates, and high explosive primers, which necessitate the use of two different materials. The electric blasting cap can be inserted into the booster without opening or rupturing the explosive cartridge, and protection against water and removal of the blasting cap during insertion in the bore holes is provided by the nose cone or coupling device. The cartridge construction is sufficiently versatile so as to allow for shooting both as single cartridges and in trains of two or more, and either form can be loaded in rough or tight holes without any problem.

The following examples, in the opinion of the inventors, represent the best embodiments of their invention.

*Example 1*

An explosive mixture of semi-solid consistency was prepared using dry mill nitrostarch, fine grained ammonium nitrate, fine grained sodium nitrate, flake aluminum, and the additional ingredients noted in the table below. The nitrostarch and mixed nitrates were thoroughly blended, and there was then added the zinc oxide, flake aluminum, guar gum, carboxymethyl cellulose, wood flour, and then the oil and water. The proportions of the final explosive composition were as follows:

| Ingredient: | Percent |
| --- | --- |
| Nitrostarch | 27.00 |
| Grained ammonium nitrate | 47.25 |
| Grain sodium nitrate | 10.75 |
| Flake aluminum | 2.50 |
| Guar gum | 2.50 |
| Oil No. 5 | 1.00 |
| Zinc oxide | 1.00 |
| Water | 8.0 |

This composition was quite stiff, and was easily extruded through long 1¼ inch diameter extrusion nozzles into cartridges two feet long and two inches in diameter, made of heavy cardboard, 0.082 inch in thickness, to approximately 2½ inches from the top. A booster charge of Pentolite was filled into the booster container 5 previously fitted into the remaining space, two inches in diameter overall, and 2½ to 3¼ inches deep. A mandrel was inserted during the charging to produce a well ⁵⁄₁₆ inch wide and 2½ inches deep, in the booster charge, for reception of a blasting cap, as shown in FIGURE 1. The open top of the booster container was then closed by a cardboard cover disk, as shown in FIGURE 1.

A Number 6 electric blasting cap was put in the well, and the cartridge then covered with a nose cone of the type shown in FIGURE 2, made of ethyl cellulose plastic, in such a way that the wires from the blasting cap were pinned against the side of the container, and emerged from around the outside end of the cone, as shown in FIGURE 2. The assembly was then inserted in a bore hole 2¼ inches in diameter. The cartridge was fired, and gave a detonation rate greater than 5500 meters per second. The explosive shock wave was recorded, and a sharp recording line was obtained.

The standard test for determining ballistic pendulum value gave a ballistic pendulum value of 11. In contrast, a high-velocity seismic gelatin in a container of the same size gave a value of 10.4, and a second commercially-available nitroglycerine explosive gave a value of 10.3.

*Example 2*

An explosive mixture of semi-solid consistency was formulated using dry mill nitrostarch, ammonium nitrate, and sodium nitrate. The ammonium nitrate and sodium nitrate were both fine-grained. These materials were mixed thoroughly, and there was then added flake aluminum, guar gum, carboxymethyl cellulose, and wood flour, after which the water was added. The proportions of the final explosive mixture were as follows.

| Ingredient: | Percent |
| --- | --- |
| Nitrostarch | 24.60 |
| Grained ammonium nitrate | 51.15 |
| Grained sodium nitrate | 10.75 |
| Flake aluminum | 2.00 |
| Guar gum | 1.00 |
| Sodium carboxymethyl cellulose | 0.60 |
| Wood flour | 1.50 |
| Zinc oxide | 1.00 |
| Water | 7.40 |

This mixture was easily extruded through long 1 inch diameter nozzles to within three inches of the top, into several open-ended cardboard cartridges 1¼ inches in diameter and two feet long, and the ends of these cartridges fitted with booster containers previously filled with Composition B. The booster containers were 2½ inches long, and slightly less than 1¼ inches in diameter.

A train of explosives was prepared, using the type of fast coupler shown in FIGURE 3, and described above. One cartridge was fitted into the coupler, crimped end in, at that end having movable teeth. A Number 16 electric blasting cap was placed in the cap well of another cartridge, the electric wires of the blasting cap threaded through the hole in the coupler, and the top or booster end of this cartridge then thrust in the other end of the fast coupler which is fitted with fixed teeth in such a manner as to have its top end abutting tightly against the crimped end of the first cartridge. Similarly other cartridges were fitted into fast couplers, crimped end in, and then put together against the top or booster end of the end cartridge in the train, producing a train containing, booster end to butt end, a total of 6 cartridges. This was then inserted in a bore hole two inches in diameter, with the blasting cap-fitted cartridge uppermost, and fired. A sharp recording line was obtained, and the velocity was greater than 5500 meters per second. The ballistic pendulum value was 11.

We claim:

1. A seismic exploration device comprising, in combination, a cartridge having heavy outside walls for retention therein of an explosive composition of semi-solid consistency, and filled with such composition; a booster charge container fitted into one end of the cartridge and supported thereby, and filled with a booster charge having a recessed portion therein for reception of an electric blasting cap; an electric blasting cap having wires attached and inserted in the recess, the wires extending from the cap out of the recess and around the booster end of the container and back along the outside of the cartridge; a wire-protecting tubular holder means fitted over and closing off the booster-end of the cartridge, and extending outwardly from, over and closely fitting against the outside of the cartridge for a substantial length thereof, forming a portion of the cartridge of greater diameter than the remainder beyond the holder means, preventing dislodging of the blasting cap from the recess due to the pinning of the wires thereof, and protecting the wires at the point of their emergence from beneath the holder means and beyond, due to its greater diameter than the cartridge.

2. A seismic exploration device in accordance with claim 1, in which the holder means includes a nose cone cap.

3. A seismic exploration device in accordance with claim 1 in which the holder means is a coupler for coupling the cartridge in a train.

4. A seismic exploration device in accordance with claim 1, including in the portion of the cartridge filled with semi-solid explosive means for taking up expansion of the composition with increase in temperature, to prevent rupture of the outside walls thereof, and dislodgement of the booster container.

5. A seismic exploration device in accordance with claim 1, comprising means attached to the booster container for holding the same in place in the cartridge.

References Cited by the Examiner

UNITED STATES PATENTS

| | | | |
|---|---|---|---|
| 1,220,208 | 3/1917 | Ellis | 102—24 |
| 2,041,950 | 5/1936 | Pierce | 102—24 |
| 2,066,635 | 1/1937 | Lux | 102—24 |
| 2,231,043 | 2/1941 | Winning | 149—58 |
| 2,358,385 | 9/1944 | Davis et al. | 149—58 |
| 2,441,397 | 5/1948 | Counterman | 102—24 |
| 2,709,407 | 5/1955 | Lowe | 102—24 |
| 2,733,658 | 8/1956 | Moat | 102—24 |
| 2,847,291 | 8/1958 | Sakuri | 149—49 |
| 2,966,822 | 1/1961 | Kistiakowsky et al. | 86—1 |
| 2,968,541 | 1/1961 | Wilt et al. | 149—59 |
| 3,037,452 | 6/1962 | Cook et al. | 102—24 |
| 3,048,103 | 8/1962 | Blair et al. | 102—24 |
| 3,059,575 | 10/1962 | Griffith et al. | 102—22 |
| 3,083,127 | 3/1963 | Griffith et al. | 149—59 |

FOREIGN PATENTS

| | | |
|---|---|---|
| 143,610 | 9/1949 | Australia. |
| 1,068,900 | 9/1952 | France. |

BENJAMIN A. BORCHELT, *Primary Examiner.*

SAMUEL BOYD, SAMUEL FEINBERG, *Examiners.*

V. R. PENDEGRASS, *Assistant Examiner.*